UNITED STATES PATENT OFFICE.

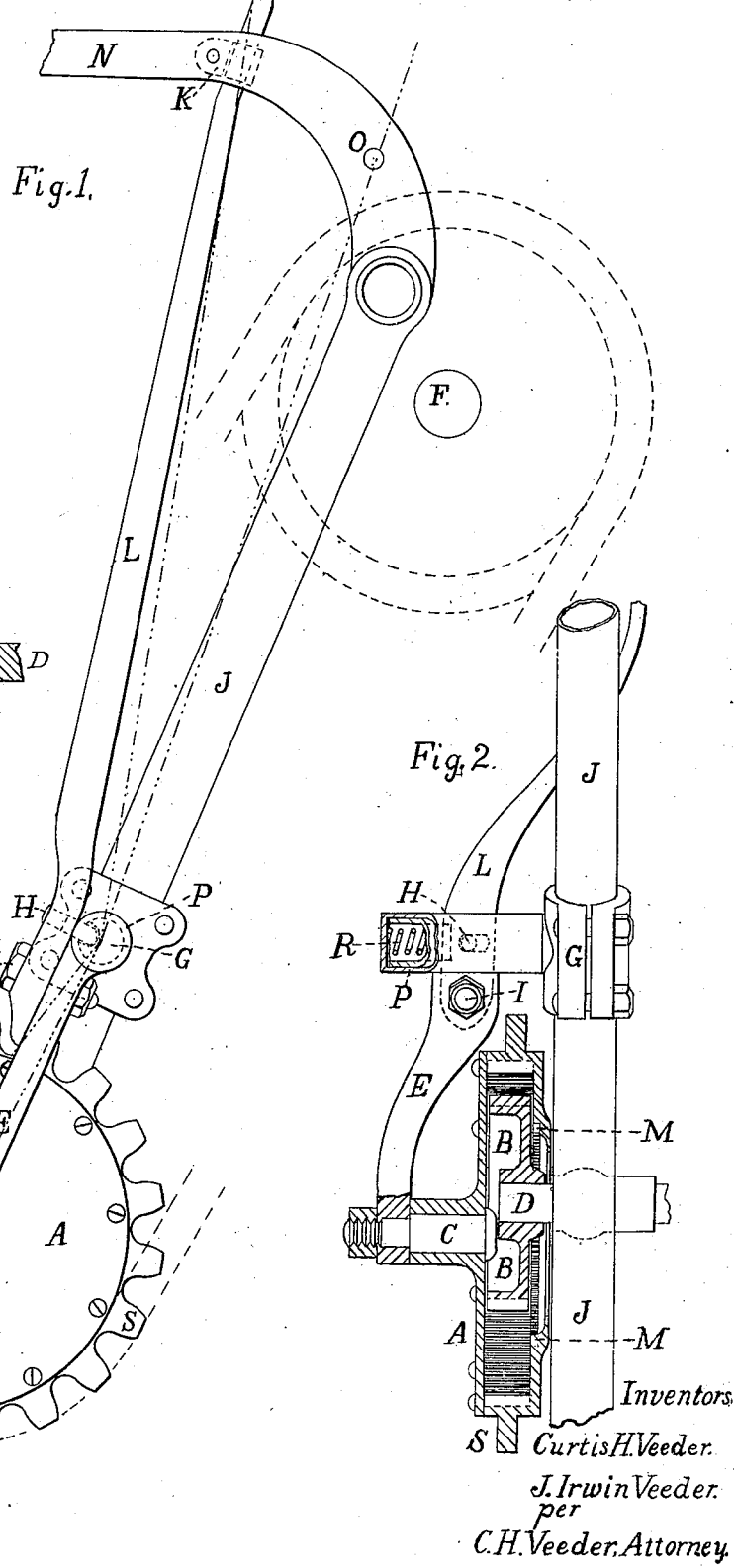

CURTIS HUSSEY VEEDER, OF BETHLEHEM, PENNSYLVANIA, AND JOHN IRWIN VEEDER, OF OMAHA, NEBRASKA.

VELOCIPEDE.

SPECIFICATION forming part of Letters Patent No. 312,407, dated February 17, 1885.

Application filed August 1, 1884. (No model.)

*To all whom it may concern:*

Be it known that we, CURTIS H. VEEDER, of Bethlehem, in the county of Northampton and State of Pennsylvania, and J. I. VEEDER, of Omaha, in the county of Douglas and State of Nebraska, have invented certain new and useful Improvements in Tricycles and Similar Vehicles, of which the following is a specification.

Our invention relates to the driving-gear of that class of velocipedes in which the rider communicates motion to the driving-wheels by means of a shaft distinct and separate from the axis of drivers, said shaft being connected to drivers by intermediate gears or chain-gearing.

The object of our invention is to provide means for the alteration of the relative speeds of the driving or pedal shaft and the driving-wheels at the pleasure of the operator. The manner of our attaining this object will be fully understood from the following description, together with the accompanying drawings, in which—

Figure 1 is a view from left side of machine, and Fig. 2 is a view from behind of a partial section on line X X' of Fig. 1.

J is a portion of left-hand side of tubular frame of tricycle.

A, Fig. 2, is an annular gear revolving freely on the pin C, and provided externally with sprockets S, (or teeth, if gearing is used,) for receiving the chain which communicates motion to driving-wheels, whose axis is at F, through balance-gear or otherwise.

For the sake of clearness the chain is not shown.

B is a pinion fastened to pedal-shaft D.

E is an arm carrying annular gear A, capable of limited motion, both endwise and circular, on stud G, which motions are controlled by lever L and pin H, Fig. 1, the lever being held in position by catch K and stop O, and being fastened to arm E by bolt I, on which it is free to turn. The pin H is firmly fixed in lever L, and passes through a large hole in sleeve P to a slot in stud G, which allows it to move circularly but not endwise of stud.

M is a cavity in center of annular gear, into which the pinion fits when they are concentric, the two then acting as a clutch.

The operation is as follows: When the annular gear A and pinion B are eccentric and in gear, as shown in Fig. 1, the number of revolutions of annular gear is less than that of pinion on pedal-shaft, and power is gained for hill-climbing, &c. If speed is wanted, the lever L is moved to stop O, Fig. 1, thus making pinion and gear concentric, and then along stop O, away from bracket N of machine, the effect of this latter movement being to move the annular gear A to the left away from frame J of machine, thus engaging the teeth of pinion B with corresponding ones on the interior of cavity M. The gear and pinion being thus locked or clutched together, their revolutions are equal. The sleeve P, Fig. 2, is not bored quite through, and a hole is drilled in end of stud G, in which a spring, R, is inserted, which takes up any slack there may be between the various parts and prevents rattle.

Fig. 3 shows stud and its mode of clamping to frame.

When gear A and pinion B are concentric and clutched, there is a certain amount of end strain on bearings of pedal-shaft, and pin c, Fig. 4, shows a device for obviating this. A sleeve, T, takes the place of pin C, Fig. 2, inside of which the stud W of annular gear A revolves. The stud is bored to receive plunger V and spiral spring, the end of stud then being closed by cap U. The pressure of the spring, exerted through the plunger on the end of shaft D, keeps the pinion B firmly seated in cavity of annular gear without other aid.

The device may be applied to tricycles in which the end of pedal-shaft is supported outside the chain-wheel, by substituting for the pin C a large annular ball or similar bearing, through which the pedal-shaft may pass and allow of eccentric motion of annular gear.

We do not confine ourselves to the precise method described in the foregoing of securing or clutching the gears when concentric, nor of altering their relative positions. The gears may be secured when concentric by a separate clutch, either operated automatically by the movement of one axis to or from the other or by the rider, or in any effectual manner. We select this method as being simple and efficient. In the case shown the chain-wheel forms part of the annular gear, and power is obtained when gears are eccentric and in gear, while speed is had when they are concentric. When the pinion forms part of the chain-wheel and the annular gear is fastened to pedal-shaft, the conditions are reversed—power when concentric, speed when eccentric.

A few of the advantages of our invention are: Fewness and simplicity of parts, there being but two gears; ease and positiveness of change from power to speed, and vice versa; absence of friction, there being no more in one position than in the ordinary single speed device, while in the other there is only that of one set of teeth against another, and pivot-friction is almost *nil*, the power being conveyed directly to chain; and great durability, as a large number of teeth are engaged simultaneously, thus distributing pressure over a large surface.

We claim as new and of our invention—

1. The combination of annular gear A and pinion B with suitable means for changing their relative positions, so that they may revolve either concentrically together or eccentrically in gear, substantially as and for the purpose set forth.

2. The combination of the sprocket or gear wheel S with annular gear A and pinion B and pedal-shaft D, substantially as set forth.

3. The combination of the annular gear A and pinion B with the shifting mechanism consisting of the arm E, stud G, lever L, pin I, and catch K, substantially as and for the purpose set forth.

4. The combination of movable arm E, stud G, and spiral spring R, as set forth.

5. A shifting device consisting of arm E, stud G, lever L, pin H, and bolt I.

6. The combination of spring and plunger V, Fig. 4, with annular gear A, and pinion B on shaft D, substantially as and for the purpose set forth.

CURTIS HUSSEY VEEDER.
JOHN IRWIN VEEDER.

Witnesses:
ERNEST HARVIER,
J. DAVIS BRODHEAD.
GEO. A. BROOKS,
A. J. MACKAY.